US007835996B2

(12) United States Patent
Sansone (10) Patent No.: US 7,835,996 B2
(45) Date of Patent: Nov. 16, 2010

(54) DUAL METERING METHOD FOR ENHANCED MAIL SECURITY

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 2677 days.

(21) Appl. No.: 10/323,346

(22) Filed: Dec. 18, 2002

(65) Prior Publication Data

US 2004/0122777 A1 Jun. 24, 2004

(51) Int. Cl.
*G06Q 30/00* (2006.01)

(52) U.S. Cl. .................................................... 705/330

(58) Field of Classification Search ....................... None
See application file for complete search history.

(56) References Cited

U.S. PATENT DOCUMENTS

| | | | |
|---|---|---|---|
| 5,043,908 A | 8/1991 | Manduley et al. | |
| 5,971,587 A | 10/1999 | Kato et al. | |
| 5,978,781 A | 11/1999 | Sansone | |
| 6,147,662 A * | 11/2000 | Grabau et al. | 343/895 |
| 6,188,996 B1 | 2/2001 | Sansone | |
| 6,208,910 B1 | 3/2001 | Michael et al. | |
| 6,211,781 B1 * | 4/2001 | McDonald | 340/505 |
| 6,249,227 B1 * | 6/2001 | Brady et al. | 340/572.1 |
| 6,275,745 B1 | 8/2001 | Critelli et al. | |
| 6,415,336 B1 | 7/2002 | Sansone | |
| 6,701,304 B2 * | 3/2004 | Leon | 705/401 |
| 2001/0007335 A1 | 7/2001 | Tuttle et al. | |
| 2002/0005774 A1 * | 1/2002 | Rudolph et al. | 340/5.61 |
| 2003/0028497 A1 * | 2/2003 | Leon | 705/408 |

FOREIGN PATENT DOCUMENTS

| | | |
|---|---|---|
| EP | 0697261 | 2/1996 |
| EP | 0697261 A2 | 2/1996 |
| EP | 1022065 | 7/2000 |

OTHER PUBLICATIONS

"RFID Technology Gives Georgia-Pacific's New Plastic Containers 'Intelligent' Capabilities." Business Wire, p. 0122, Nov. 13, 2000.*

* cited by examiner

*Primary Examiner*—Rob Wu
(74) *Attorney, Agent, or Firm*—Angelo N. Chaclas; Steven J. Shapiro (57) ABSTRACT

The security feature of a postal indicia is enhanced by recording a number in a memory of a radio frequency identification tag that is linked to a dual meter user before the tag is delivered to the user of the dual meter; processing by the dual meter the number recorded in the radio frequency identification tag memory when the dual postal indicia is being composed; storing the processed number in the radio frequency tag memory; affixing a postal indicia portion of a dual postal indicia and a radio frequency identification tag portion of a dual postal indicia to a mail piece; and uploading the number recoded in the radio frequency identification tag memory and the processed number stored in the radio frequency tag memory to a data center.

30 Claims, 7 Drawing Sheets

FIGURE 1A

Prior art

Ajax widget Co.
1 Main ST
Stamford CT 06926 1010

US POSTAGE $00.37⁰
Nov. 25 1996
FROM SHELTON CT 06484
METER PB12345678901234

First Class

Mr. J HOMEOWNER
123 Palm ST
Fort Lauderdale FL 03333 1231

DUAL METERING METHOD FOR ENHANCED MAIL SECURITY

FIELD OF THE INVENTION

The invention relates generally to the field of mailing systems and, more particularly, to mail security systems.

BACKGROUND OF THE INVENTION

Governments have created postal services for collecting, sorting and distributing the mail. The postal service typically charges mailers for delivering the mail. Mailers may pay the postal service for this service by purchasing a stamp, i.e., a printed adhesive label or tape, issued by the postal service at specified prices, that is affixed to all letters, parcels or other mail matter to show prepayment of postage. Another means of payment accepted by the postal service is mail that is metered by a postage meter. Postage meters are approved by the Postal Service and licensed to the meter user by the meter manufacturer. A postage meter is an electromechanical device that maintains, through "electronic registers" or "postal security devices," an account of all postage printed, and the remaining balance of prepaid postage; and prints postage postmarks (indicia) or provides postage postmarks (indicia) information to a printer, that are then printed and accepted by the postal service as evidence of the prepayment of postage.

Currently, mailers are able to use their desktop computer, a postal security device, and a printer to apply postage directly onto envelopes or labels while applying an address. The postage is applied in the form of an Information Based Indicia (IBI). The IBI consists of a two-dimensional bar code containing hundreds of bytes of information about the mail piece and certain human-readable information. The indicia include a digital signature to preclude the forgery of indicia by unauthorized parties. The postal security device is a unique security device that provides a cryptographic digital signature to the indicia and performs the function of postage meter registers.

In postage meters and computer postage systems, the need for security is absolute, because postage meters and computer postage systems are printing value; and, unless security measures are taken, one would be able to print unauthorized postage, i.e., postage for which no payment is made, thereby defrauding the postal service.

Although postage meters and computer postage systems have performed satisfactorily in the past and continue to perform satisfactorily, with the advancement of technology, it is becoming easier to print fraudulent indicia.

SUMMARY OF THE INVENTION

This invention overcomes the disadvantages of the prior art by utilizing a method to create secure postal indicia that is fixed in two or more different mediums, i.e., printed on a mail piece with normal ink and/or invisible ink, and recorded in a radio frequency identification (RFID) tag. The security feature is enhanced by having a meter perform some function to a number that is stored in the RFID tag memory, i.e., add an increasing value to the number, store the number that has the increased value in the RFID memory, and then upload the number that was originally stored in the RFID memory and the new increased value number to a data center, where the number that is currently stored in the RFID memory is matched with the uploaded numbers. When the mail piece, flat or package (hereinafter called "mail piece") is processed by the postal service, the postal service will read the new number that has the increased value and search the new number data base for the number currently being processed to determine if the new increased value number was uploaded with the number originally stored in the RFID memory. Then the number is checked to determine whether or not the number was previously used. If the number was previously used, the indicia is invalid. If the number was not previously used, the indicia is valid, and the number is marked used in the database.

An advantage of this invention is that it will be more difficult to produce a fraudulent indicia, because a security feature that appears in the indicia has been modified. Thus, if one copied the indicia, i.e., the number currently stored in the RFID memory will not be found in the data center records or the number currently stored in the RFID memory will be found in the data center records as a used number; hence, the indicia may be fraudulent.

BRIEF DESCRIPTION OF THE DRAWINGS

FIG. 1B is a drawing of a mail piece having a prior art information based indicia affixed thereto;

DETAILED DESCRIPTION OF THE PREFERRED EMBODIMENT

Figure 1A:
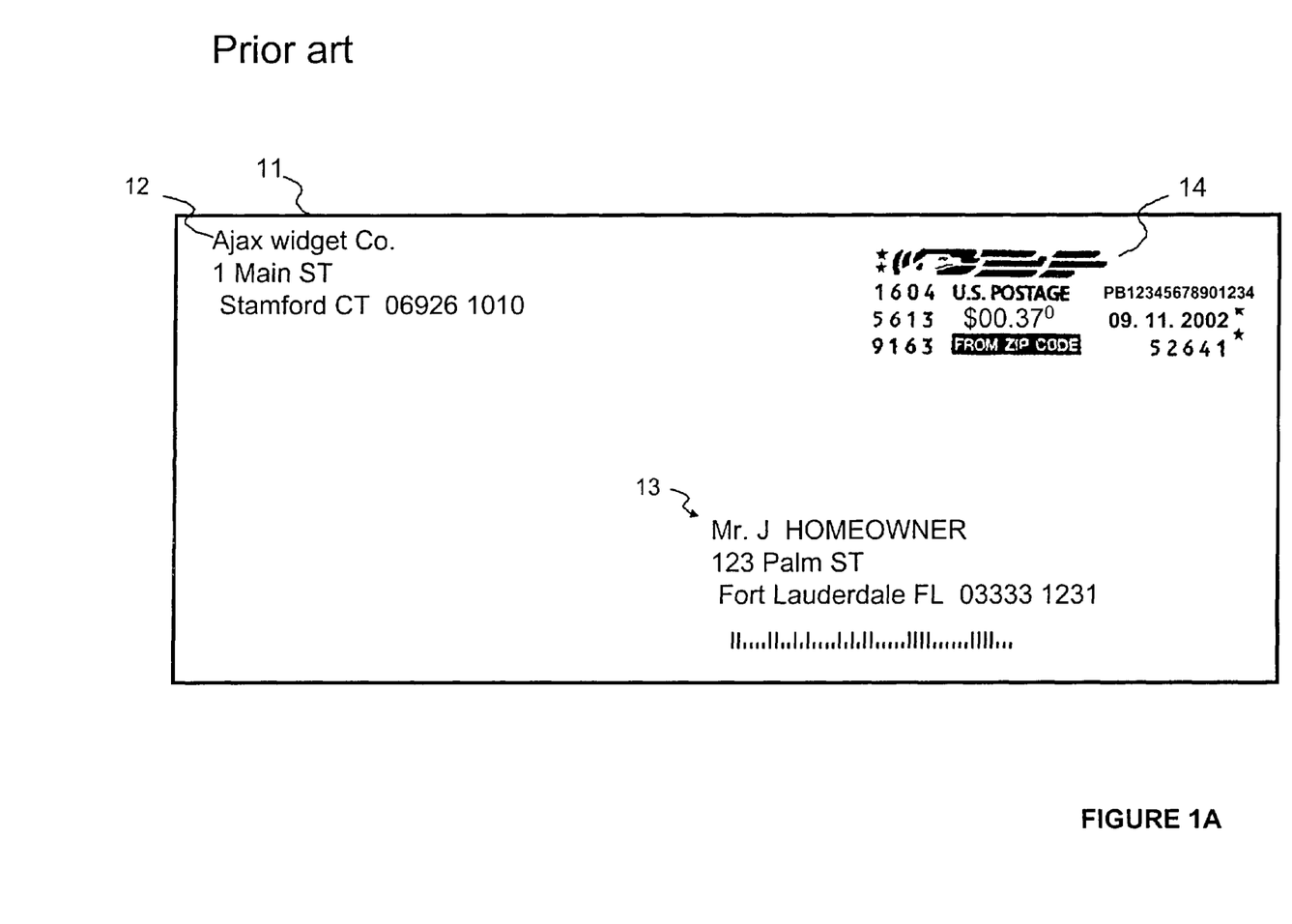
FIG. 1A is a drawing of a mail piece having a prior art digital postal indicia affixed thereto.

Referring now to the drawings in detail and more particularly to FIG. 1A, the reference character 11 represents a mail piece, i.e., letter, flat, parcel, etc., that has a sender address field 12, a recipient address field 13, and a prior art digital postal indicia 14.

FIG. 1B is a drawing of a mail piece 11 having a prior art information based indicia 10 affixed thereto. Mail piece 11 has a sender address field 12 and a recipient address field 13.

Figure 2:
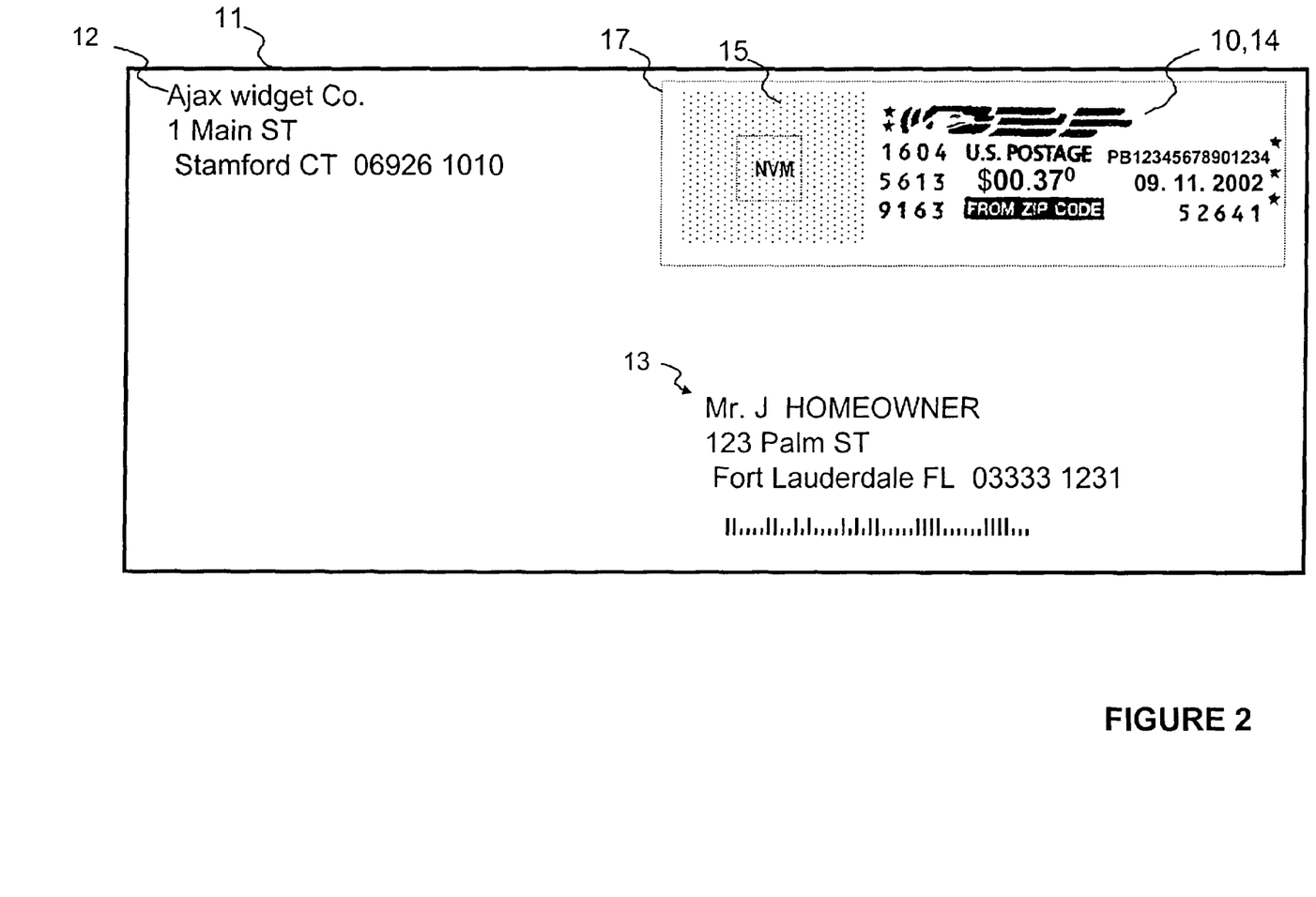
FIG. 2 is a drawing of a mail piece having a label with a postal meter indicia printed on the label and a radio frequency identification tag device embedded in the label that is affixed to the mail piece.

FIG. 2 is a drawing of a mail piece having a label 17 with a postal meter indicia 10 printed on label 17 and an electronic device, i.e., radio frequency identification tag device 15 embedded in the label that is affixed to the mail piece. Mail piece 11 has a sender address field 12, a recipient address field 13, and a radio frequency identification tag 15 that contains specified information. Postal indicia 14 may be a digital postal indicia or a permit indicia. Information based indicia 10 may be substituted for indicia 14. It would be obvious to one skilled in the art that indicia 10 or 14 may be directly printed on mail piece 11 and tag 15 affixed to mail piece 11 by an adhesive. An invisible ink that may be viewed with an ultraviolet light source, such as a red fluorescent or blue fluorescent ink, etc., may be used to print indicia 10 or indicia 14. Radio frequency identification (RFID) tag 15 may be the 4×6 RFID Smart Label Philips manufactured by RAFEC USA of 999 Oakmont Plaza Drive, Suite 200,Westmont, Ill.

60559. The information contained in tag 15 is a unique sequenced identification number that is placed in tag 15 in the factory during the manufacture of tag 15 and a number generated by the dual meter using the unique sequenced identification number.

Figure 3:
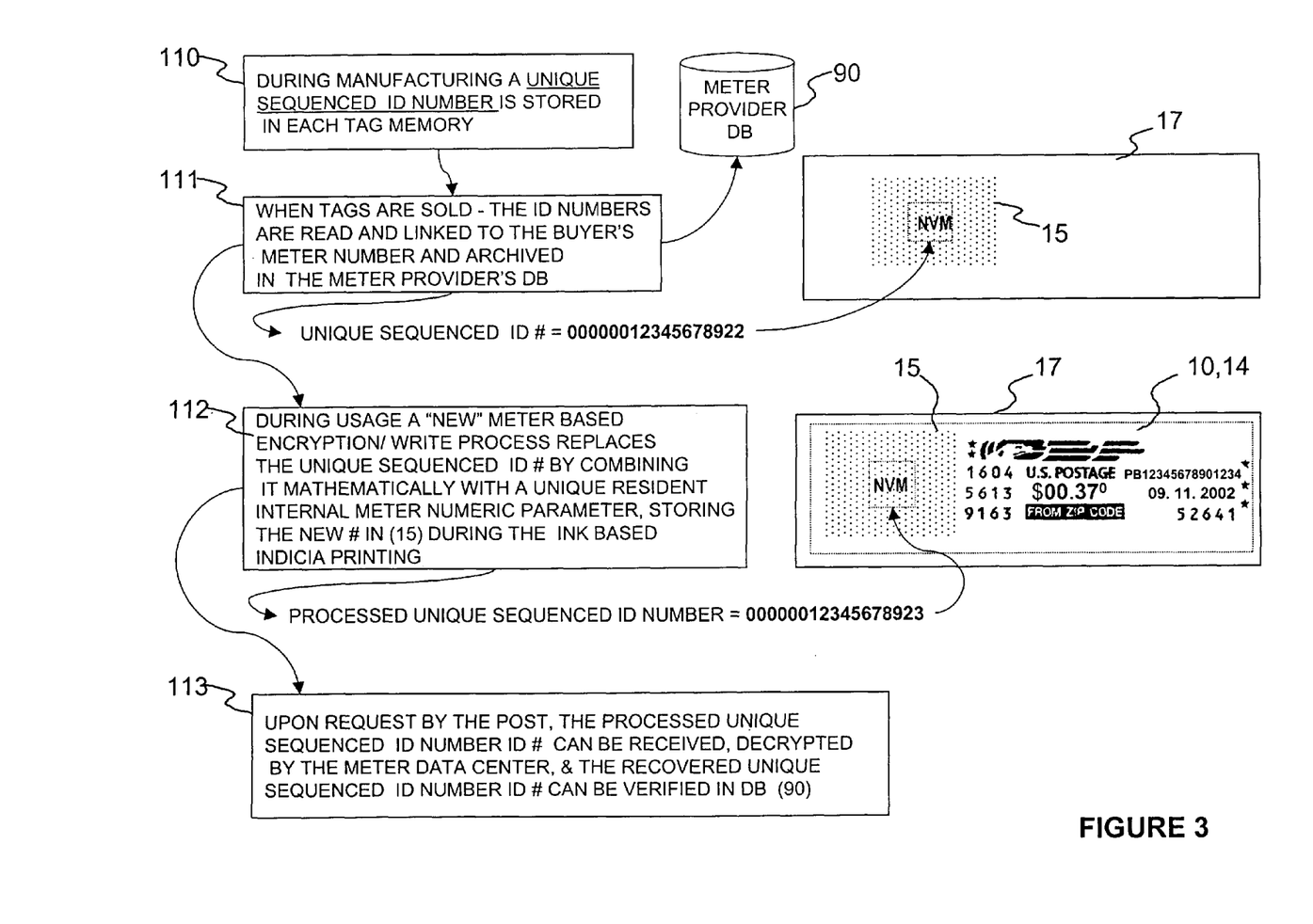
FIG. 3 is a drawing showing the information that is being processed by radio frequency identification tag 15.

FIG. 3 is drawing showing the information that is being processed by radio frequency identification tag 15. Box 110 illustrates that during the manufacture of tag 15, a unique sequenced identification number is stored in each memory of tag 15. Then in box 111 when tag 15 is sold, the identification numbers stored in the memories of tag 15 are read and linked to the buyer's meter number and archived in the meter provider's database 90. The unique sequenced identification number may be 00000012345678922,which is written into the memory of tag 15 of label 17.

Now in box 112, during usage of the dual meter, a "new" meter based encryption/write process replaces the unique sequenced identification number by combining it mathematically with a unique resident internal dual meter numeric parameter, storing it in the memory of tag 15 of label 17 during the ink based indicia printing sequence of the dual meter. A number, i.e., 1,may be added to the unique sequenced identification number to obtain a processed unique sequenced identification number. Thus, the processed unique sequenced identification number will be 00000012345678923. It would be obvious to one skilled in the art that a unique sequenced identification number may be changed to a processed unique sequenced identification number by performing some mathematical function on the unique sequenced identification number, i.e., addition, subtraction, division, multiplication, etc. The data center may also control the changing of a unique sequenced identification number to a processed unique sequenced identification number by encrypting a unique sequenced identification number using a downloaded and updateable encryption key.

Next, in box 113 upon request by the postal service, the processed unique sequenced identification number may be received, decrypted by the meter data center, and the recovered unique sequenced identification number, may be obtained and verified in database 90.

Figure 4:
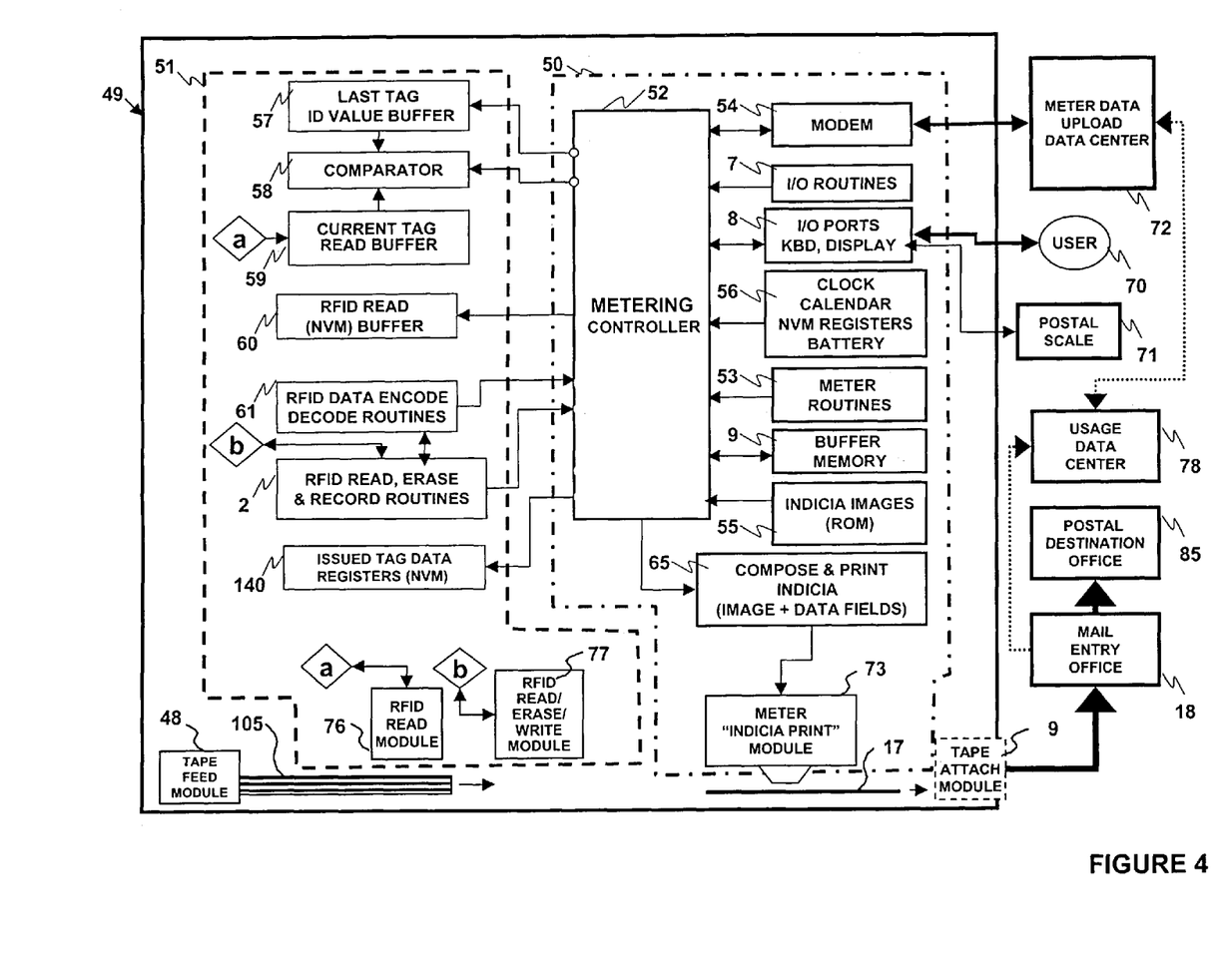
FIG. 4 is a block diagram of a dual meter that contains an electronic postage meter and a radio frequency identification reader/writer.

FIG. 4 is a block diagram of a dual meter 49 that contains electronic postage meter 50, a radio frequency identification reader/writer 51, tape feed module 48 and a tape attach module 9. Postage meter 50 may be the B700 Post Perfect postage meter manufactured by Pitney Bowes Inc. of Stamford, Conn.

Metering controller 52 functions as a meter controller for postage meter 50 and a controller for radio frequency identification reader/writer 51. Controller 52 is coupled to last tag identification value buffer 57, comparator 58, current read tag buffer 59, radio frequency identification read non-volatile memory buffer 60, radio frequency identification data encode/decode routines 61, radio frequency identification read, erase and record routine 2, and issued tag data registers non-volatile memory 140. Comparator 58 is coupled to last tag identification value buffer 57 and current tag read buffer 59. Buffer 59 is coupled to radio frequency identification data read module 76, and radio frequency identification encode/decode routines 61 is coupled to radio frequency identification read, erase and record routine 2. Routines 2 are also coupled to radio frequency identification read/erase/record module 77.

Electronic meter 50 includes meter routines 53, modem 54, indicia image routines read only memory 55, clock calendar non-volatile memory registers and battery 56, I/O routines 7, I/O ports keyboard and display 8, buffer memory 9 and compose and print indicia image and data fields 65. Controller 52 is coupled to modem 54, I/O routines 7, meter routines 53, I/O port keyboard and display 8. Compose and print indicia 65 is coupled to meter indicia print module 73 and controller 52.

Meter 50 begins to function when a user 70 sets the postage dollar amount by weighing mail piece 11 (FIG. 1) on scale 71 and enters the type of service for mail piece 11 into I/O ports, keyboard and display 8 of meter 50. The weight and amount of postage for mail piece 11 are displayed by display 8. Controller 52 will compose an image of indicia 10, 14 (FIGS. 1, 2) using the fixed graphic indicia images from indicia images ROM 55 and compose and print indicia images and data field 65. The above image will be stored in buffer memory 9. Buffer memory 9 will provide the above image to meter controller 52.

Meter routines 53 will handle the accounting functions of meter 50. Routines 53 are not being described, because one skilled in the art is aware of their operation and function. Clock calendar non-volatile memory registers and battery 56 will transmit the date and time to controller 52.

Modem 54 may communicate with meter data upload data center 72 during a refill of postage meter 50 by exchanging funds. User 70 of dual meter 49 communicates with I/O ports keyboard display 8. Postal scale 71 is coupled to I/O ports keyboard display 58 and is used to determine the weight of mail piece 11. Meter data upload data center 72 is coupled to usage data center 78. Office 18 receives mail that has been processed by dual meter 49. Mail flows from office 18 to destination delivery office 85 (currently the USPS has approximately 35,000 mail entry and destination offices). Data center 78 is coupled to mail entry office 18. The images and data fields of indicias 10 and 14 will be transmitted from compose and print indicia 65 to meter indicia print module 73.

Comparator 58 will compare the last tag identification value stored in buffer 57 with the value read by module 76. If comparator 58 determines that the above values are not the same, then tag 15 is a new tag.

Radio frequency identification read buffer 60 is a nonvolatile memory that is used to store the information that is read from tag 15 in case of a power failure, and radio frequency identification data encode/decode routines 61 are used to decode the information read from tag 15 and encode data that is going to be recorded in tag 15. Radio frequency identification read, erase and record routines 2 are used to read, erase and record information into tag 15. Issued tag data registers nonvolatile memory 140 stores the information recorded in tag 15, which is uploaded to data center 78 via data center 72.

Tape and feed module 48 contains a stack of labels 105 that include tag 15. Label 17 is transported past radio frequency identification read module 76. Module 76 is positioned in a manner that it will be able to read the information recorded in tags 15 so that module 76 will be able to determine whether or not information has been previously recorded into tag 15. Then label 17 will be transported to module 77 where information will be read, erased and recorded on tag 15. Then label 17 will be transported to paper tape attach module 49. After information is recorded or re-recorded on tag 15, label 17 will be positioned adjacent module 73 so that indicias 10 or 14 may be printed on label 17. Module 9 will affix label 17 to mail piece 11 (FIGS. 1, 2).

Figure 5:
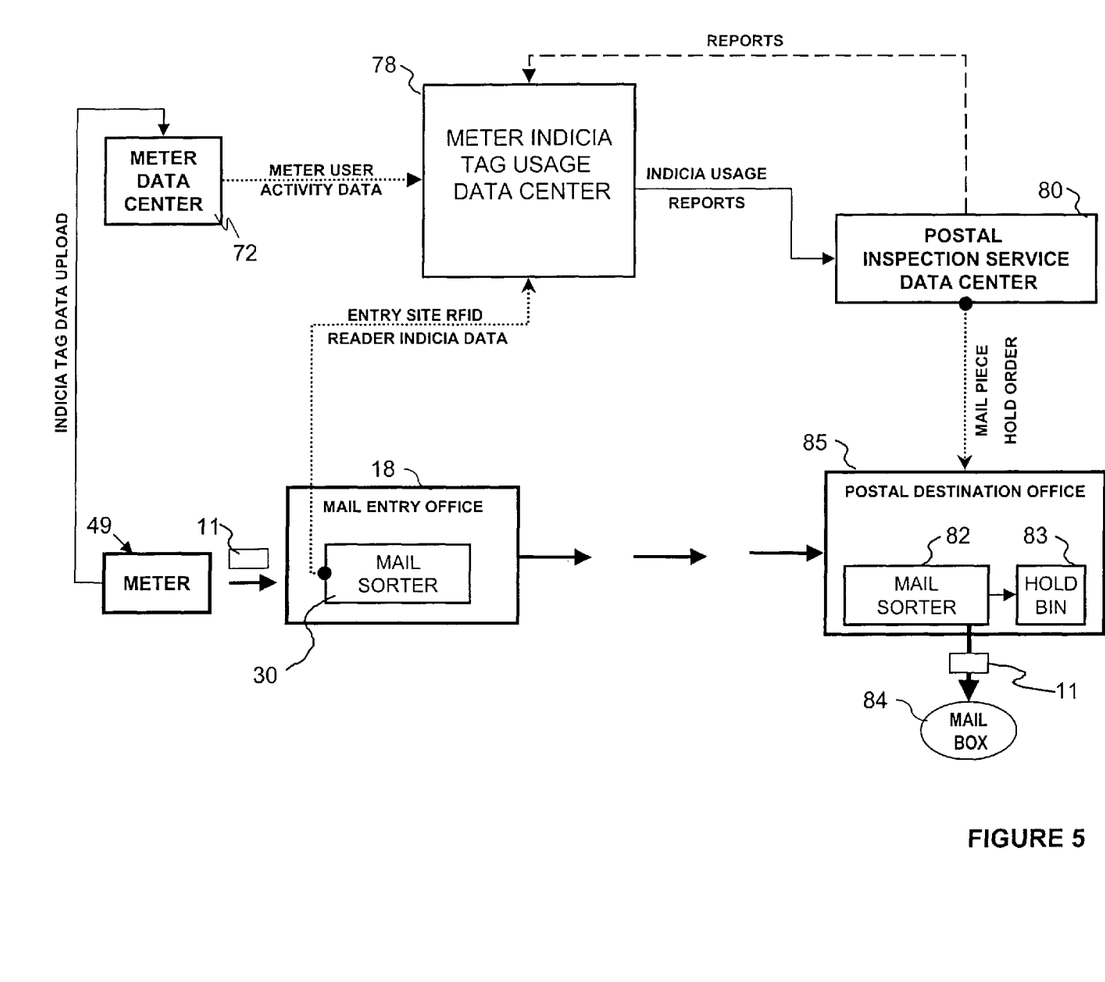
FIG. 5 is a drawing showing how mail pieces are processed from mail entry office 18 of a carrier to a recipient and how data is captured and distributed.

FIG. 5 is a drawing showing how mail is processed from mail entry office 18 of a carrier to a recipient's mail box 84 and how data is captured and distributed. Mail piece 11 that is produced by dual meter 49 enters mail entry office 18 where it is sorted by mail sorter 30. The processed unique sequenced identification number is transmitted to data center 78. The unique sequenced identification number stored in tag 15 at the factory may also be transmitted to data center 78. Data center 78 receives information from mail entry office 18 and meter data center 72, which receives indicia tag 15 data, i.e., processed unique sequenced identification numbers, from meter 49 and/or unique sequenced identification numbers and processed unique sequenced identification numbers from meter 49.

Figure 6:
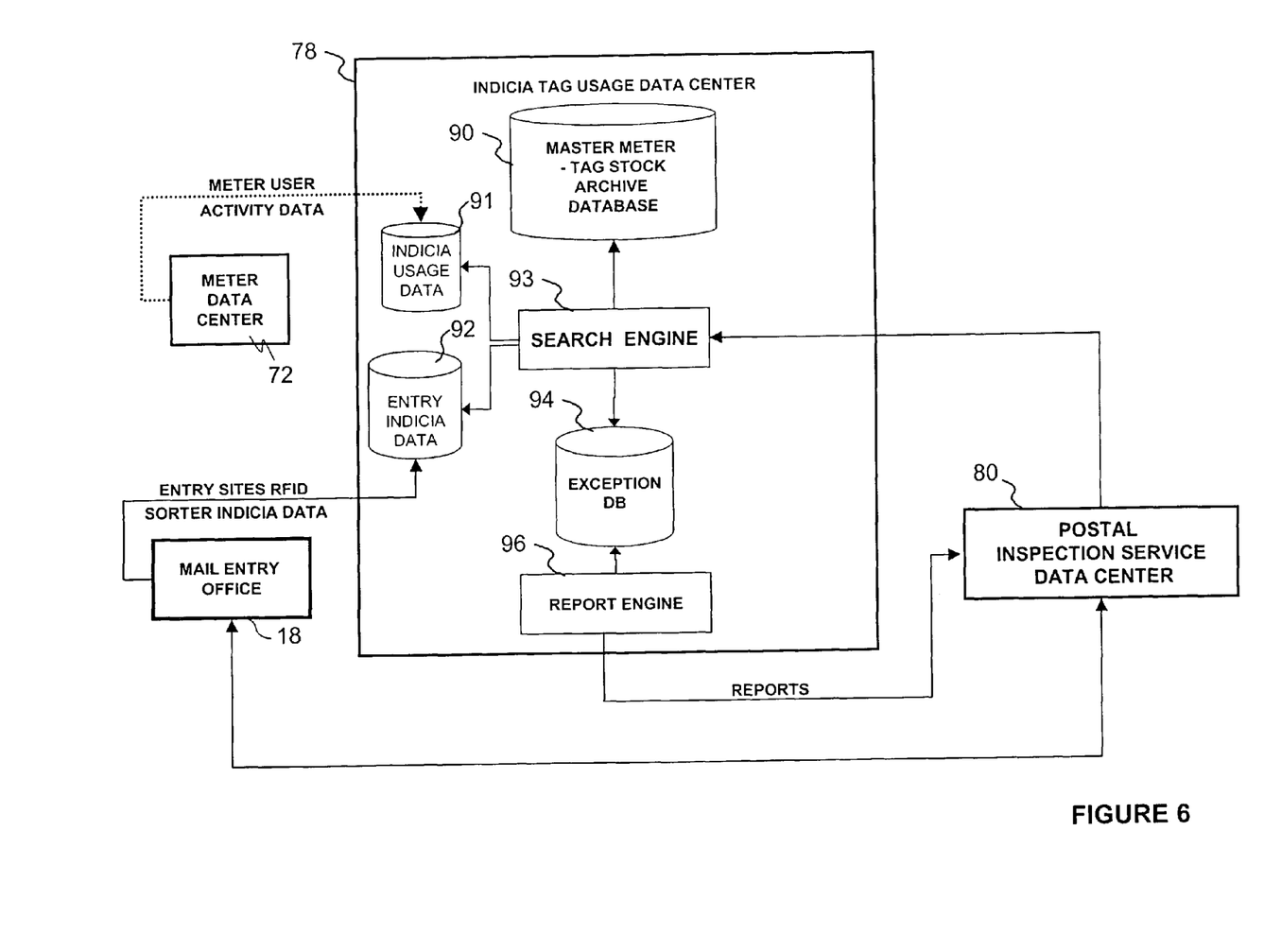
FIG. 6 is a drawing of indicia tag usage data center 78.

Data center 78 will be more fully described in the description of FIG. 6. Postal inspection service data center 80 is coupled to data center 78 and postal destination office 85. Data center 78 prepares reports that indicate the usage of tags 15.

Data center 80 may inform postal destination office 85 of the mail pieces 11 that they want to hold in bin 83. Data center 80 may investigate and/or arrest people who are generating and/or copying fraudulent tags 15. Mail sorter 82 sorts the mail to allow mail piece 11 to be delivered to mail box 84. Data center 80 accepts reports from postal destination office 85, and postal destination office 85 receives mail pieces from mail entry office 18.

FIG. 6 is a drawing of indicia tag usage data center 78. Data center 78 includes master meter tag stock archive database 90, which is coupled to search engine 93 which is coupled to exception database 94 which is coupled to search engine 93 and report engine 96, which is coupled to postal inspection service data center 80. Indicia usage database 91 is coupled to search engine 93, meter data center 72 and to entry indicia data 92, which is coupled to mail entry office 18. Postal inspection service data center 80 is coupled to search engine 93, report engine 96 and mail entry office 18. Mail entry office 18 is coupled to entry indicia data 92.

Master meter tag stock archive database 90 contains an archived list of the unique sequenced identification numbers stored in the memory of each tag 15, that is linked to the tag buyers meter number. Indicia usage database 91 receives the identity of dual meter 49, the activity of dual meter 49 from data center 72 (FIG. 5). Entry indicia data 92 receives the information read from tag 15 (FIGS. 1, 2) from mail entry office 18. When search engine 93 is activated, engine 93 reads databases 91 and 92 for mail pieces 11 and examines database 90 for matches, i.e., the information stored in archive 90 should match the information buffered in indicia usage data 91 and entry indicia data 92. In other words, are the unique sequenced identification numbers and the processed unique sequenced identification numbers stored in the memory of tags 15 archived in database 90. When a match is found, the records of archive database 90 record this fact. If a match is not found, an exception is created, which is stored in exception database 94. If more than one match is detected, one or more copies have been detected, and the exceptions are stored in database 94.

Reports engine 96 sends reports to data center 80. The aforementioned reports may contain information regarding the suspicious usage of tags 15, i.e., the tags 15 that have the same processed unique sequenced identification numbers and/or the tags 15 that do not have a processed unique sequenced identification number or unique sequenced identification number stored in archived database 90 and tags 15 that have identification numbers that are not associated with a dual meter 49.

The above specification describes a new and improved method for increasing the security of mail. It is realized that the above description may indicate to those skilled in the art additional ways in which the principles of this invention may be used without departing from the spirit. Therefore, it is intended that this invention be limited only by the scope of the appended claims.

What is claimed is:

1. A method for creating a dual postal indicia, said method comprises the steps of:
   A. recording a number in a memory of an electronic device that is linked to a dual meter user before the electronic device is delivered to the user of the dual meter;
   B. processing by the dual meter the number recorded in the electronic device memory to produce a processed number that is different from the number recorded in the electronic device memory when the dual postal indicia is being composed;
   C. storing the processed number in the electronic device memory;
   D. affixing a postal indicia portion of a dual postal indicia and a electronic device portion of a dual postal indicia to a mail piece; and
   E. uploading the processed number stored in the electronic device memory to a data center.

2. The method claimed in claim 1, wherein the electronic device is a radio frequency identification tag.

3. The method claimed in claim 1, further including the step of:
   uploading the number recorded in the electronic device memory.

4. The method claimed in claim 1, wherein the postal indicia portion of the dual postal indicia is printed on the mail piece.

5. The method claimed in claim 1, wherein the postal indicia portion of the dual postal indicia is printed on a label and the tag portion of the dual postal indicia is affixed to a label that is affixed to a mail piece.

6. The method claimed in claim 1, wherein the postal indicia portion of the dual postal indicia is printed on the mail piece with an invisible ink.

7. The method claimed in claim 1, wherein the processing step further includes the step of:
   performing one or more mathematical functions on the processed number to produce a unique sequenced identification number.

8. The method claimed in claim 7, further including the steps of:
   matching the uploaded numbers; and
   storing the uploaded numbers in a data base.

9. The method claimed in claim 7, further including the steps of:
   mailing the mail piece;
   reading the stored processed number;
   searching the data base for the number that is being read; and
   checking the data base to determine whether or not the number was previously used, whereby if the number was previously used, the indicia is invalid;
   and, if the number was not previously used, the indicia is valid.

10. The method claimed in claim 9, further including the steps of:
    marking the data base to indicate that number being read is used.

11. The method claimed in claim 1, wherein the processing step further includes the step of:
    adding an increasing value to the number recorded in the electronic device memory.

12. The method claimed in claim 1, wherein the processing step further includes the step of:
    adding a decreasing value to the number recorded in electronic device memory.

13. The method claimed in claim 1, wherein the processing step further includes the step of:
   dividing a value to the number recorded in the electronic device memory.

14. The method claimed in claim 1, wherein the processing step further includes the step of:
   multiplying a value to the number recorded in the electronic device memory.

15. The method claimed in claim 1, wherein the processing step further includes the step of:
   subtracting a value to the number recorded in the electronic device memory after the number recorded in a radio frequency identification tag memory is processed.

16. The method claimed in claim 1, wherein the processing step further includes the step of:
   encrypting the number recorded in the electronic device memory with a downloaded up datable key.

17. The method claimed in claim 1, wherein the processing step further includes the step of:
   erasing the number recorded in the electronic device memory after the number recorded in a radio frequency identification tag memory is processed.

18. A method for tagging a mailpiece, said method comprises the steps of:
   providing an electronic device having a memory storing identification data, wherein said device is affixed to a mail piece;
   processing the identification data recorded in said memory to generate further data; that is different from the stored identification data, storing the further data in said memory; and
   affixing the electronic device to a mail piece.

19. The method claimed in claim 18, wherein the electronic device is a radio frequency identification tag.

20. The method claimed in claim 18, further including the step of:
   uploading the identification data recorded in the electronic device to a data center.

21. The method claimed in claim 18, wherein said identification data is a unique sequenced identification number.

22. The method claimed in claim 18, wherein said electronic device is linked to a meter user.

23. The method claimed in claim 18, wherein the postal indicia is printed on a label which is affixed to a mail piece.

24. The method claimed in claim 18, wherein the processing step further includes the step of:
   performing one or more mathematical functions on the identification data.

25. The method claimed in claim 18, wherein the processing step further includes the step of:
   encrypting the data recorded in the memory with a downloaded updatable key.

26. The method claimed in claim 18, wherein the processing step further includes the step of:
   erasing the identification data from said memory after the further data has been generated.

27. The method claimed in claim 18, further including the steps of:
   reading the stored further data;
   searching a data base for the data that is being read; and
   checking the data base to determine whether or not the data was previously used, whereby if the data was previously used, it is invalid and, if the data was not previously used, it is valid.

28. A system for tagging a mailpiece comprising:
   an electronic device having a memory for storing identification data, wherein said device is affixed to a mail piece;
   means for processing the identification data recorded in said memory to generate further data;
   means for storing said further data in said memory; and
   means for affixing the electronic device to a mailpiece.

29. A system according to claim 27, wherein the electronic device is a radio frequency identification tag.

30. The system claimed in claim 27, further comprising:
   means for uploading the identification data to a data center.

* * * * *